UNITED STATES PATENT OFFICE.

JULIUS STOCKHAUSEN, OF KREFELD, GERMANY.

PROCESS OF REMOVING FAT AND IMPURITIES FROM VEGETABLE AND ANIMAL MATERIALS.

1,035,815.     Specification of Letters Patent.     Patented Aug. 13, 1912.

No Drawing. Original application filed October 1, 1908, Serial No. 455,732. Divided and this application filed July 13, 1909. Serial No. 507,443.

*To all whom it may concern:*

Be it known that I, JULIUS STOCKHAUSEN, a subject of the German Empire, residing at 105 Fischelnerstrasse, Krefeld, Germany, have invented a new and useful Improvement in the Process of Removing Fat and Impurities from Vegetable and Animal Materials; and I do hereby declare the following to be a full, clear, and exact description of the same.

This invention relates to a detergent process. While this process has not for its primary object the extraction of fats and other oils, nevertheless fats and oils are removed thereby.

This application is a division of the application Ser. No. 455732, filed by me on October 1, 1908.

To carry out my process I subject the above mentioned materials to treatment with an emulsion formed as follows: I take chlorids of the hydrocarbons having more than one carbon atom, such as tetrachlorethane, pentachlorethane, trichlorethylene and perchlorethylene. Then I emulsify by means of sulfonated products, especially sulfonated oils or fats, or Turkey-red oil, or the soap obtained by saponification of sulfonated fats or oils with at least 6% of sodium hydrate. Ordinary soaps and saponaceous compounds—although to a less degree—can also be emulsified with the above mentioned cholrids.

Below are given four specific examples illustrating the process in detail:

I. 10 kilograms cotton are well moistened with warm water and then treated with a solution of 1.5 kilograms calcinated soda dissolved in a sufficient quantity of water. At the same time, 300 to 400 grams of a mixture of so-called monopol soap (*i. e.* a soap obtained by treating sulfonate oils or fats *e. g.* castor oil with more than 6% of caustic soda preferably at high temperature) mixed with 60 to 80 parts of tetrachlorethane, pentachlorethane, trichlorethylene or perchlorethylene are dissolved in a sufficient quantity of water to obtain a thorough impregnation of the cotton with the solution. The cotton is treated with the aqueous solution of said mixture for about 5 to 10 minutes at 70° centigrade and then boiled therewith during half an hour. Thereafter the cotton is rinsed, centrifugated and dried in the usual way.

II. 125 kilograms cotton waste are treated with 16 kilograms soda, 4 kilograms water-glass, 34 degrees Baumé, and 2 to 3 kilograms of the above mentioned mixture in the same way as described above under Example I.

III. Wool is treated with the above mentioned mixture (about 2 to 4 per cent. of the wool being used) and a suitable amount of alkali is added to saponify the dissolved fat in the same way as described under Example I.

IV. 25 kilograms leather are treated with 300 to 500 grams of the above mentioned mixture dissolved in a sufficient quantity of water and mixed with a small quantity of ammonia in a fulling trough. Also the grains of the leather can be rubbed off with the same liquid.

The new process of removing fat and impurities (called briefly later on defatting) possesses the following advantages over the processes used up to the present time: The goods are penetrated more easily and more strongly than in present processes, which act only on the surface of the goods. The new process renders possible a considerably more thorough removal of the fat, and this is of importance, especially in the washing of wool, because its amount of contained fat must be reduced as low as possible, namely to less than 1%, in order to obtain satisfactory results in the further treatment, viz: bleaching and dyeing. In processes in use hitherto this is only possible, if washing with soap is also employed, but, with the improved process, the same result can be obtained without the use of any soap at all. Furthermore, the new process does not stain the goods by precipitates produced by water containing lime (such waters being very injurious for washing and dyeing purposes) while the processes employed at present do stain the goods when water containing lime is used for washing.

Having thus fully described my invention, what I claim is:—

1. The process of defatting vegetable and animal materials, and substitutes for same, which consists in emulsifying by means of sulfonated products—such as sulfonated oils or fats, or Turkey-red oil—chlorids of hydrocarbons having more than one carbon atom, and treating the said animal and vegetable materials with the resulting emulsion.

2. The process of defatting vegetable and animal materials, and substitutes for the same, which consists in saponifying sulfonated fats or oils with at least 6% sodium hydrate, emulsifying with the soap thus formed chlorids of hydrocarbons having more than one carbon atom, and treating the said vegetable and animal materials with the resulting emulsion.

In testimony whereof, I have signed my name to this specification in the presence of two subscribing witnesses.

JULIUS STOCKHAUSEN.

Witnesses:
HENRY QUADFLING,
ELISE KOCLBUSCH.